US012673445B2

(12) United States Patent
Liu et al.

(10) Patent No.: US 12,673,445 B2
(45) Date of Patent: Jul. 7, 2026

(54) DIRECT MANUFACTURING METHOD FOR CERAMICS COMPONENT WITH COMPLEX STRUCTURE BASED ON LASER 3D PRINTING AND CERAMIC COMPONENT WITH COMPLEX STRUCTURE

(71) Applicant: Wuhan University of Technology, Hubei (CN)

(72) Inventors: Kai Liu, Hubei (CN); Tianyang Li, Hubei (CN); Song Zhang, Hubei (CN); Rong Tu, Hubei (CN); Ce Sun, Hubei (CN); Jiahao Ye, Hubei (CN); Yuhan Liao, Hubei (CN)

(73) Assignee: Wuhan University of Technology, Hubei (CN)

( * ) Notice: Subject to any disclaimer, the term of this patent is extended or adjusted under 35 U.S.C. 154(b) by 126 days.

(21) Appl. No.: 18/601,975

(22) Filed: Mar. 11, 2024

(65) Prior Publication Data
US 2025/0033241 A1     Jan. 30, 2025

(30) Foreign Application Priority Data

Jul. 27, 2023     (CN) ........................ 202310942743.X

(51) Int. Cl.
B28B 1/00          (2006.01)
B33Y 30/00         (2015.01)
         (Continued)

(52) U.S. Cl.
CPC .............. B28B 1/001 (2013.01); B33Y 30/00 (2014.12); B33Y 50/02 (2014.12); B33Y 70/00 (2014.12)

(58) Field of Classification Search
None
See application file for complete search history.

(56) References Cited

U.S. PATENT DOCUMENTS

2020/0368967 A1*  11/2020  Zhan ........................ B22F 10/28
2021/0296124 A1*   9/2021  Gagnon ............ H01L 21/02576
                          (Continued)

FOREIGN PATENT DOCUMENTS

CN          106003726 A  * 10/2016  ............. B33Y 30/00
CN          106563804 A  *  4/2017  ............. B22F 10/22
                          (Continued)

*Primary Examiner* — Seyed Masoud Malekzadeh
*Assistant Examiner* — Xinwen Ye
(74) *Attorney, Agent, or Firm* — JCIP GLOBAL INC.

(57) ABSTRACT

A manufacturing method for ceramics with complex structure by laser 3D printing, includes acquiring a three-dimensional model of a complex component to be fabricated, and devising a laser scanning path; placing a substrate in a gas-phase reactor chamber, followed by vacuuming and aerating vapor mixture of gas-phase precursors and carrier gas into the gas-phase reactor chamber; preheating the substrate to a specified temperature, turning on a laser and a thermal imager, the thermal imager controlling laser power in real time by generating a two-dimensional temperature map of a laser spot to realize temperature control a the printing process; setting a distance between the flat-field focusing lens and the substrate and a laser scanning speed; after stacking another one of the ceramic sheets repeatedly, until completing a fabrication of a ceramic complex component.

7 Claims, 3 Drawing Sheets

(51) Int. Cl.
    *B33Y 50/02*           (2015.01)
    *B33Y 70/00*           (2020.01)

(56) References Cited

U.S. PATENT DOCUMENTS

| | | | | |
|---|---|---|---|---|
| 2022/0285134 | A1* | 9/2022 | Rao | B33Y 70/10 |
| 2024/0254622 | A1* | 8/2024 | Delehouze | F01D 5/28 |
| 2024/0399656 | A1* | 12/2024 | Müller | B29C 64/118 |

FOREIGN PATENT DOCUMENTS

| | | | | |
|---|---|---|---|---|
| WO | WO-2019191585 A1 * | 10/2019 | | B23K 26/0732 |
| WO | WO-2021041110 A1 * | 3/2021 | | C04B 35/111 |

* cited by examiner

1. Draw the 3D model of the component and slice it

2. Place the substrate into the gas phase reactor chamber and vacuum the chamber

3. Implement the wanted ceramic complex component model

4. Aerate the mixed gas of precursor and carrier gas

5. Turn on the resistance heater right below the base plate

6. Turn on the laser and the thermal imager

7. Turn on the galvanometer and start laser processing

8. Observe printed samples

9. Stop aerating the mixed gas and turn off the laser

10. Cool down to room temperature naturally under vacuum and take out the sample

FIG. 2

DIRECT MANUFACTURING METHOD FOR CERAMICS COMPONENT WITH COMPLEX STRUCTURE BASED ON LASER 3D PRINTING AND CERAMIC COMPONENT WITH COMPLEX STRUCTURE

CROSS-REFERENCE TO RELATED APPLICATION

This application claims the priority benefit of China application serial no. 202310942743.X, filed on Jul. 27, 2023. The entirety of the above-mentioned patent application is hereby incorporated by reference herein and made a part of this specification.

TECHNICAL FIELD

The present invention pertains to the technical field of ceramic additive manufacturing. It specifically concerns high-end ceramic complex components fabricated using laser 3D printing, as well as to the associated manufacturing method for producing high-end ceramic complex components based on laser 3D printing.

BACKGROUND

Advanced ceramic materials have garnered significant attention across diverse sectors including national defense, petroleum, chemical production, machinery, aerospace, and nuclear energy, owing to their superior properties, such as oxidation resistance, wear resistance, high hardness, robust thermal stability and chemical corrosion resistance. However, the inherent brittleness, low ductility, and poor machinability of advanced ceramics make ceramic materials difficult to manufacture components with complex-shape. Traditional processes such as molding and gel injection molding are restricted to crafting simple structural components, significantly limiting the engineering applications of advanced ceramics.

With the progression of equipment and raw material preparation technology, individuals can attain intricately shaped ceramic components with high mechanical properties through additive manufacturing technology. Nonetheless, the existing additive manufacturing technology employ an indirect method of "print molding and sintering post-treatment" to procure ceramic materials. These techniques also come with an extended molding cycle, numerous procedures, a high risk of distortion, among other limitations.

Consequently, the present invention implements a novel manufacturing method for complex components of high-end ceramics. This method enables in-situ, rapid directional growth of ceramics and the acquisition complex structural high-end ceramic components with enhanced purity and performance. It significantly shortens the manufacturing cycle of ceramic parts while concurrently improving the quality of ceramic parts. This innovation holds substantial engineering significance and addresses an urgent technical challenge for researchers.

SUMMARY OF INVENTION

One of the objectives of the present invention is to provide a method for manufacturing complex components of high-end ceramics based on laser 3D printing.

Another One of the objectives of the present invention is to provide complex components of high-end ceramic material based on laser 3D printing.

To realize the first objective, the technical solution adopted the following technical solution for manufacturing complex components of high-end ceramics using laser 3D printing:

S1, obtaining a three-dimensional model of the complex component to be fabricated and planning a laser scanning path;

S2, placing a substrate in a gas-phase reactor chamber, and then vacuuming and aerating a vapor mixture of gas-phase precursors and carrier gas into the gas-phase reactor chamber;

S3, preheating the substrate to a specified temperature, turning on a laser and a thermal imager. The thermal imager controls the laser power in real time by generating a two-dimensional temperature map of the laser spot to realize temperature control of the printing process;

S4, setting the distance between the flat-field focusing lens and the substrate, and the laser scanning speed. The deflection angle of the galvanometer is adjusted to control the laser spot to be deflected to each scanning point on the laser scanning path in turn, so as to thermally decompose the gas-phase precursor and generate a ceramic sheet on the substrate;

S5, after completing the stacking of each layer of ceramic sheet, controlling the substrate to drop the height corresponding to the thickness of the ceramic sheet of the layer. Then continuing the stacking of the next layer of ceramic sheet, layer by layer, until completing the fabrication of the high-end ceramic complex component.

The overarching approach of this method for manufacturing complex high-end ceramic components using laser 3D printing, as described below:

The existing method of producing ceramics by 'printing and molding and sintering post-treatment' is beset with a series of issues: a lengthy molding cycle, numerous processes, and a tendency for deformation. This has led to notable limitations in both efficiency and quality. In response, the present invention implements a novel method that primarily employs a high-energy laser to decompose gas-phase precursors into ceramic monomers. Then use a scanning galvanometer system to control the laser direction and scan layer by layer. The proximity between a flat-field focusing lens (F-theta) and a substrate, in addition to the speed of the laser scan, are meticulously controlled to generate ceramic sheets of the correct form. Subsequent layering of each ceramic sheet upon the substrate culminates in a composite structure. This innovative approach allows for the in-situ preparation and swift, directed growth of ceramic materials. The stacking of layers of ceramic materials is facilitated by maintaining a fixed laser focusing distance, achievable through the axial displacement of the substrate. Compared to conventional manufacturing methods, this inventive method not only markedly reduces the manufacturing duration of ceramic parts but also enhances the purity and performance of the resultant high-end, complex ceramic components.

Preferably, the mentioned three-dimensional model is a CAD model, which is saved in STL format. Then slice the model through slicing software and save the file.

In step S2, the pressure after evacuation treatment is maintained below 10 Pa; the pressure within the vacuum reactor chamber, post passing the vapor mixture, is maintained at 0.4 to 10 kPa.

In step S2, the volume ratio of gas phase precursor to carrier gas in the mentioned vapor mixture is maintained at 1:(1~100). Preferably, the volume ratio of the gas phase precursor to the carrier gas is kept at 1:(1~25). Specifically, in step S2, two separate gas cylinders are used, one containing the gas phase precursor and the other containing the carrier gas. Both cylinders are opened. The carrier gas's flow rate is measured and regulated using a mass flow meter, as it is implemented into the evaporator from the gas cylinder through a pipe. The vapor mixture, comprising the gas phase precursor and the carrier gas, exits the evaporator through the outlet pipe. Upon achieving a steady state, the mixture of gas phase precursor and carrier gas continues to flow from the evaporator to the gas phase reactor chamber at a constant flow rate. The flow rate of the carrier gas varies gradually depending on the desired volume ratio of carrier gas to gas phase precursor.

In step S2, the gas phase precursor is selected from one or a combination of methyltrichlorosilane (MTS), tetramethylsilane (TMS), silicon tetrachloride ($SiCl_4$), ammonia ($NH_3$), hexamethyldisilane (HMDS), and trimethylaminoborane (TMAB).

In step S2, the mentioned carrier gas is selected from hydrogen or argon.

In step S3, the substrate is preheated to a temperature 200 to 400° C. lower than the reaction temperature of the gas-phase precursor. Specifically, a resistance heating element is positioned underneath the substrate for preheating. Preferably, the preheating temperature ranges from 900 to 1250° C., while the temperature of the formed ceramic sheet ranges from 1300 to 1600° C.

In step S3, during the formation of the laser spot, the thermal imager is turned on. It is used to generate a two-dimensional temperature map of the laser spot in order to adjust the laser power accordingly, ensuring the laser spot maintains a constant average temperature, realizing temperature control for the printing process.

In step S4, the scanning speed of the laser is 80 to 150 μm/s, with the distance between the flat-field focusing lens and the substrate at 30 to 45 cm. In the present invention, the scanning speed of the laser is a key factor in ensuring the shape and purity of the ceramic components of the complex structure. When the scanning speed is too fast, the gas-phase precursor will not be able to fully decompose and cause structural defects in the ceramic sheet. When the scanning speed is too slow, the ceramic sheet will be locally too thick, resulting in a weak interlayer bonding force affecting the performance of the ceramic component. Further, the perpendicular distance between the flat-field focusing lens and the substrate also affects the size of the generated laser spot. When the laser spot is too large, it results in poor dimensional accuracy of the printed ceramic component. When the laser spot is small, it results in more accurate printed parts, but also longer print times for slightly larger parts. A suitable spot size permits rapid fabrication of ceramic parts on a millimeter scale. Preferably, the mentioned laser spot has a diameter of 100 to 200 km. By controlling the diameter of the laser spot, it is possible to determine the characteristic dimensions of the ceramic component, and thus accurately and rapidly fabricate the ceramic structure.

Specifically, in step S4, the galvanometer is turned on to initiate the processing. The high-energy laser beam utilized to achieve amplified collimation through the beam expander mirror. Both the X-axis and the Y-axis scanning galvanometer are deflected to a predetermined angle using a control board. Then, through the flat field focusing (F-theta) lens, the laser spot is deflection to each scanning point, in accordance with the scanning path to ensure accurate scanning. As the laser spot moves, consistent laser power is applied to the initial layer of the molded part. The chamber gas undergoes thermal decomposes at the reaction temperature, creating ceramic sheets that are stacked one on top of the other on the substrate surface. With each addition of a ceramic layer, the Z-axis platform beneath the substrate lowers correspondingly.

Preferably, in steps S4 and S5, the printed samples are observed in real time using a customized short focal length telescope and a CCD camera. Once the stacking of the last layer is completed, the carrier gas containing the gas phase precursor stops aerating, the laser is turned off. The chamber is then vacuumed using the tail gas treatment unit. Following this, the chamber is naturally cooled to room temperature to obtain the desired complex shaped, high purity ceramic components.

Further, the method presented in this invention for manufacturing complex components of high-end ceramic materials is based on laser 3D printing. It holds the advantage of high printing precision and is exceptionally suited for the shaping of small-sized components. Preferably, in step S5, the dimensional size of the ceramic component forming plane does not exceed 100×100 mm².

In order to achieve the second objective of this invention, a technical solution adopted is the provision of a complex component made of high-end ceramic material, based on laser 3D printing. The mentioned complex component is produced by a manufacturing method, which is in accordance with one of the objectives of this present invention.

Compared with the prior technologies, the advantageous effects of the present invention include:

(1) The present invention provides a manufacturing method for complex components of high-end ceramics based on laser 3D printing. This method allows for in-situ preparation and rapid, directional growth of ceramics. Adjusting the laser focusing distance by axial displacement of the substrate enables the layer-by-layer stacking of ceramics. Unlike traditional manufacturing techniques, this invention significantly reduces manufacturing cycle of the ceramic parts and aids in attaining higher purity and superior performance in the complex structure of high-end ceramic components.

(2) The complex components of high-end ceramic materials, produced by the present invention, have numerous benefits including short molding cycle, fewer processes, lightweight, high purity, high density, good mechanical properties. It can overcome the limitations of traditional 3D printing methods to prepare complex ceramic components through the indirect method of "printing and sintering post-processing" to achieve densification, and has broad prospects for promotion and application.

BRIEF DESCRIPTION OF DRAWINGS

FIG. 2 shows a flow diagram for a manufacturing method of complex components of high-end ceramics using laser 3D printing, according to an embodiment of the present invention.

FIG. 3A is the XRD diagram of the SiC composites obtained by "selective laser sintering+reactive melt infiltration" in the corresponding example; FIG. 3B is the XRD diagram of the SiC composites obtained by the Example 1 of the present invention.

DESCRIPTION OF EMBODIMENTS

The technical solutions of the present invention are clearly and comprehensively described in the following sections in connection with embodiments. It is important to note that the described embodiments are merely a part of the embodiments of the present invention and not exhaustive. Based on the embodiments in the present invention, all other embodiments obtained by a person of ordinary skill in the art without making creative labor fall within the scope of protection of the present invention.

It should be emphasized that the embodiments and the features in the embodiments in the present invention may be seamlessly combined with each other without any conflict.

The following detailed description of specific embodiments is provided to further elucidate the present invention, but not to limit its scope. A schematic structural diagram of the main apparatus involved in the method for manufacturing complex components of high-end ceramic materials based on laser 3D printing provided by embodiments of the present invention is shown in FIG. 1.

Figure 1:
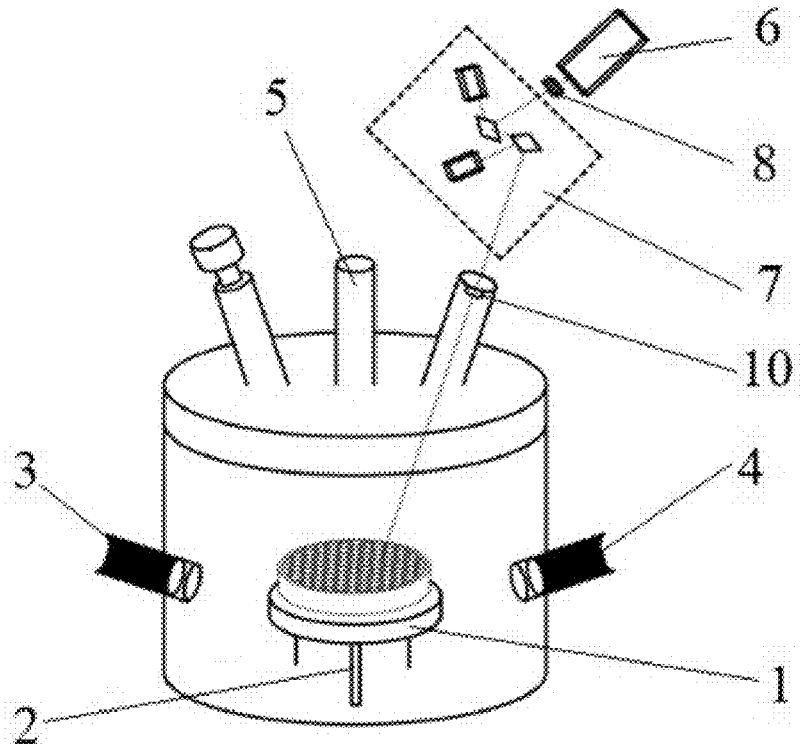
FIG. 1 is a schematic diagram illustrating the structure of a main device involved in the manufacturing method for complex component of high-end ceramics utilizing laser 3D printing, as provided by an embodiment of the present invention.

Referring to FIG. 1, the embodiment of the present invention uses a reactor chamber housing a 10 cm diameter substrate 1. The resistance heating element is positioned below the substrate 1. An evacuation system 3 and an exhaust gas treatment system 4 are positioned outside the reactor chamber. The precursor inlet 5 is positioned at the top of the reactor chamber. The vapor mixture of gas-phase precursors and a carrier gas pass through the precursor inlet 5 to enter the interior of the reactor chamber, generating a specific pressure. The laser 6, located above the reactor chamber, sends the high-energy laser beam passes through a beam expander mirror 8 to achieve collimation and amplification. The beam is deflected at a fixed angle by the x-axis scanning galvanometer and the y-axis scanning galvanometer within the galvanometer scanning system 7, respectively. Then, it is further directed to specific scanning points on the substrate 1 via the flat field focusing lens (F-theta) 10. Precise scanning is accomplished in accordance with the scanning path. As the laser spot moves, the laser applies a constant laser power to the first layer of the molded part. The chamber gas is thermally decomposed at the reaction temperature. This process allows the gas phase precursor in the reaction chamber to deposit on the surface of the substrate under the laser, forming a ceramic sheet. Further, a z-axis moving platform 2 is provided below the substrate 1. By adjusting the z-axis moving platform to move in the vertical direction, the substrate 1 is controlled to move downward by a distance corresponding to the thickness of each layer of stacked ceramic sheets, thereby ensuring that the flat-field focusing lens 10 The distance from the substrate remains constant.

Example 1

As shown in FIG. 2, a manufacturing method of complex components of high-end ceramic materials based on laser 3D printing comprises the following steps:

1) Draw the STL model of the honeycomb structure mirror in Creo Parametric software, slice the model through slicing software and save the file.

2) Place the graphite substrate on the substrate seat of the gas phase precursor reactor chamber, and vacuum the pressure to less than 10 Pa.

3) Implement the honeycomb structure mirror SiC component into the control software for the three-dimensional model. Set the preheating temperature to 1100° C., the laser scanning rate to 125 μm/s, adjust the spot size to 200 μm, and adjust the distance from the flat-field focusing lens to the substrate through the Z-axis moving platform to 45 cm. The component plans a reasonable laser scanning path based on the SiC component to be formed.

4) Open the gas bottle containing Ar and send the measured flow rate 100 sccm of Ar into the evaporator containing hexamethyldisilane (HMDS) through the mass flow controller. The volume ratio of HMDS to Ar is 1:25. Allow the vapor mixture of HMDS and Ar to flow out of the evaporator through the outlet pipe. After reaching a stable state, continuously flow the mixed gas of HMDS vapor and Ar from the evaporator to the gas phase reactor chamber at a constant rate, maintaining the reactor chamber pressure at 600 Pa.

5) Turn on the resistance heating element located right below the substrate to heat the entire substrate to 1100° C.

6) Turn on the $CO_2$ laser and thermal imager to locally heat a small area on the graphite substrate to 1300° C. and maintain it stably. Use the thermal imager to generate a two-dimensional temperature map of the laser spot to control the laser power during the process, ensuring the laser spot reaches a constant average temperature.

7) Turn on the galvanometer and start processing, using the high-energy laser beam of the $CO_2$ laser through the beam expander for magnification and collimation. Use the X-axis and Y-axis scanning galvanometer to deflect at a fixed angle, then deflect the laser spot to each scanning point through the F-theta lens, completing precise scanning according to the scanning path. As the laser spot moves, the $CO_2$ laser applies constant laser power to the first layer of the formed component. The chamber gas thermally decomposed at the reaction temperature, generating SiC silicon carbide ceramic sheets that stack on the surface of the substrate, layer by layer. With each layer deposited, the Z-axis moving platform below the substrate descends by the corresponding thickness of that layer.

8) Use a customized short focal length telescope and CCD camera to monitor the printed sample in real time.

9) Until the last layer of deposition is completed, stop aerating the carrier gas containing HMDS, turn off the $CO_2$ laser, and engage the exhaust gas treatment device to vacuum extract and naturally cool to room temperature, the desired SiC ceramic component of the honeycomb structure mirror body is obtained.

Example 2

A method of manufacturing complex components of high-end ceramic materials based on laser 3D printing comprises the following steps:

1) Create a STL model of the honeycomb structure mirror body in Creo Parametric software, slice it through slicing software and save the file.

2) Cut the graphite substrate and place it on the holder in the gas phase reactor chamber. Vacuum it to reduce the pressure to less than 10 Pa.

3) Implement the three-dimensional model of the silicon boron carbon nitrogen (SiBCN) component of the honeycomb structure mirror body to be formed into the control software. Set the preheating temperature is 1210° C., the laser scanning rate to 105 μm/s. Adjust the spot size to 100 μm, and the distance from the flat field focusing lens to the substrate at 30 cm using the Z-axis lifting device. Plan an appropriate laser scanning path for the SiBCN ceramic component using the control software.

4) Open the gas bottle containing Ar and implement the measured flow rate of 80 sccm Ar into the evaporator containing HMDS and TMAB through the mass flow controller. Maintain the volume ratio of HMDS, TMAB, and Ar at 2:1:5. The vapor mixture of HMDS and TMAB exits the evaporator through the outlet pipe. After reaching a stable state, continue to flow the mixed gas of HMDS and TMAB vapor and Ar from the evaporator to the gas phase reactor chamber, maintaining the reactor chamber pressure at 800 Pa.

5) Turn on the resistance heating element located just below the substrate to heat the entire substrate to 1210° C.

6) Turn on the Nd:YAG laser and thermal imager to locally heat a small spot on the graphite substrate to 1510° C. and maintain stability. Use the thermal imager to generate a two-dimensional temperature map of the laser spot to control the laser power during the processing, ensuring laser spot maintains a constant average temperature.

7) Start the galvanometer for processing. Use the high-energy Nd:YAG laser through the beam expander for magnification and collimation. Deflect the X-axis and Y-axis scanning galvanometer at a fixed angle respectively, then deflect the laser spot to each scanning point through the F-theta lens, completing precise scanning according to the scanning path. The Nd:YAG laser applies a constant laser power to the first layer of the component being formed following the movement of the laser spot. The chamber gas thermally decomposes at the reaction temperature to generate SiBCN ceramic sheets, that stack on the surface of the substrate layer by layer. With each layer deposited, the Z-axis moving platform below the substrate descends by the corresponding thickness of that layer.

8) Use a customized short focal length telescope and CCD camera to observe the printing sample in real time.

9) Upon completion of the final layer deposition, stop the flow of the carrier gas containing HMDS and TMAB. Turn off the Nd:YAG laser, and use the exhaust gas treatment device to vacuum and naturally cool to room temperature, and then obtain the required silicon boron carbon nitride ceramic component of the honeycomb structure mirror body.

Example 3

A method for manufacturing complex components of high-end ceramic materials based on laser 3D printing, comprising the following steps:

1) Design a honeycomb structure mirror body STL model in Creo Parametric software, process it through slicing software, and save the file.

2) Place a graphite substrate on the substrate holder in the chamber of a gas phase reactor, vacuum the chamber to reduce the pressure to below 10 Pa.

3) Implement the 3D model of the desired honeycomb structure mirror body silicon nitride component into the control software, set the preheating temperature to 1000° C., laser scanning rate to 85 m/s, adjust the spot size to 100 μm, and use a Z-axis lifting device to adjust the distance from the planar focusing lens to the substrate to 30 cm. The control software plans a reasonable laser scanning path based on the desired silicon nitride component.

4) Open gas cylinders containing $NH_3$ and $H_2$, implement $H_2$ at a measured flow rate of 1000 sccm into a $SiCl_4$ evaporator. The volume ratio of $SiCl_4$, $NH_3$, and $H_2$ is 1:5:10. The vapor mixture of $SiCl_4$ and $H_2$ flows out of the evaporator through an outlet pipe. Once stable, the mixed gas of $SiCl_4$ and $H_2$ vapor and $NH_3$ flows from the evaporator to the gas phase reactor chamber at a constant flow rate, maintaining the reactor chamber pressure at 10 kPa.

5) Turn on the resistance heating element directly below the substrate to heat the substrate to 1000° C.

6) Turn on an Nd:YAG laser and a thermal imager. Locally heat a small point on the graphite substrate to 1300° C. and maintain stability. Use the thermal imager to generate a 2D temperature map of the laser spot to control the laser power during processing, ensuring a constant average temperature of the laser spot.

7) Start the galvanometer and begin processing. Use the Nd:YAG laser's high-energy laser beam, amplified and collimated through an expansion lens, deflected at a fixed angle by the X-axis and Y-axis scanning galvanometers, then directed to each scanning point through an F-theta lens, completing precise scanning along the path. As the laser spot moves, the Nd:YAG laser applies a constant laser power to the first layer of the component. The chamber gas thermally decomposes at the reaction temperature, forming silicon nitride ceramic layers that accumulate on the substrate surface, layer by layer. After each layer is deposited, the Z-axis moving platform below the substrate descends by a corresponding thickness.

8) Use a custom short-focus telescope and CCD camera for real-time observation of the printed sample.

9) Continue until the final layer is accumulated. Stop the introduction of the carrier gas containing $SiCl_4$ and $NH_3$, turn off the Nd:YAG laser, vacuum the chamber using an exhaust gas treatment device, and naturally cool to room temperature to obtain the desired honeycomb structure mirror body silicon nitride ceramic component.

Comparative Sample

This comparative example adopts the method of "laser selective sintering, phenolic resin impregnation pyrolysis and reaction sintering" to prepare silicon carbide components. The specific preparation method is as follows:

1) Use laser selective sintering equipment to print the honeycomb structure mirror body. Employ SiC powder as the main raw material, and phenolic Resin (PF) serves as the binder.

2) Set the printing parameters as follows: laser scanning speed 2000 mm/s, molded sample layer thickness of 0.1 mm, and a processing temperature of 60° C.

3) After printing, remove the organic matter from the printed SiC/PF green body by carbonization, producing a SiC/C preform.

4) The preform undergoes a phenolic resin impregnation pyrolysis pre-strengthening treatment to obtain a SiC/C impregnated pyrolysis preform.

5) Put the SiC/C impregnated pyrolysis preform into a vacuum sintering furnace covered with excess silicon particles.

6) Vacuum the sintering furnace and raise the temperature to 1400° C. at 2° C./min and hold it there for 30 minutes. Then increase the temperature to 1670° C. for reaction sintering at the same rate, holding it there for 2 hours.

7) After the sintering furnace is cooled to room temperature, remove the sample to obtain the final product—a honeycomb structure mirror body made of SiC ceramic components.

Performance Testing and Characterization

Figure 3A:
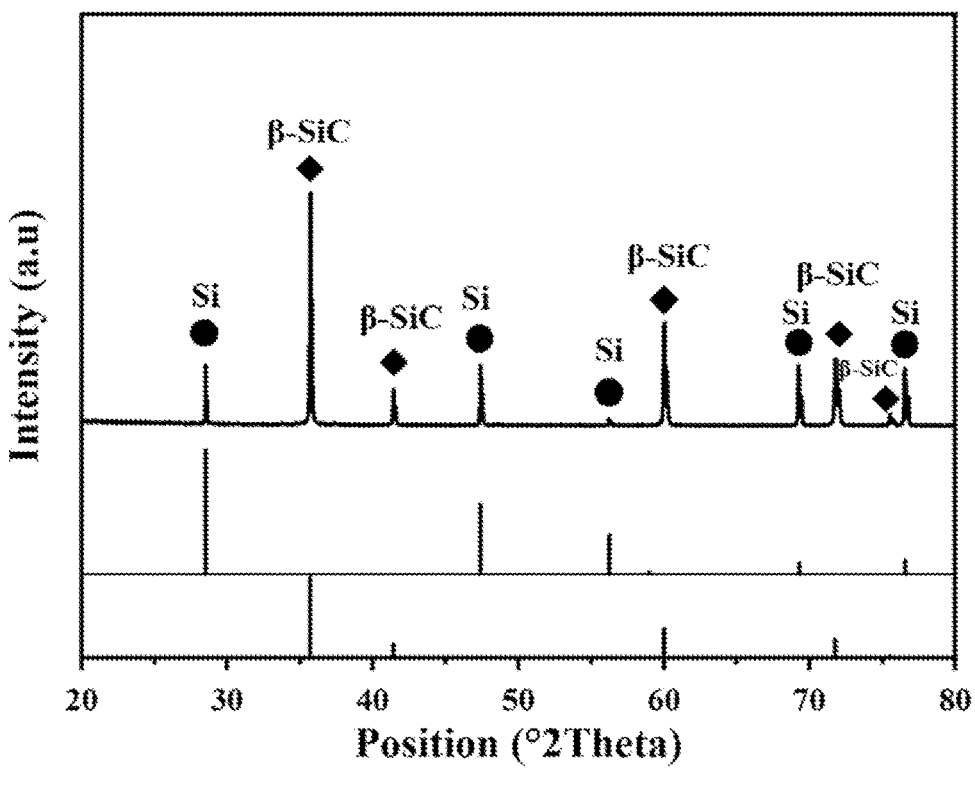
FIG. 3A and FIG. 3B show the X-ray diffractometer (XRD) comparison diagrams of silicon carbide (SiC) composites fabricated according to Example 1 and comparative examples of the present invention; Herein.
Figure 3B:
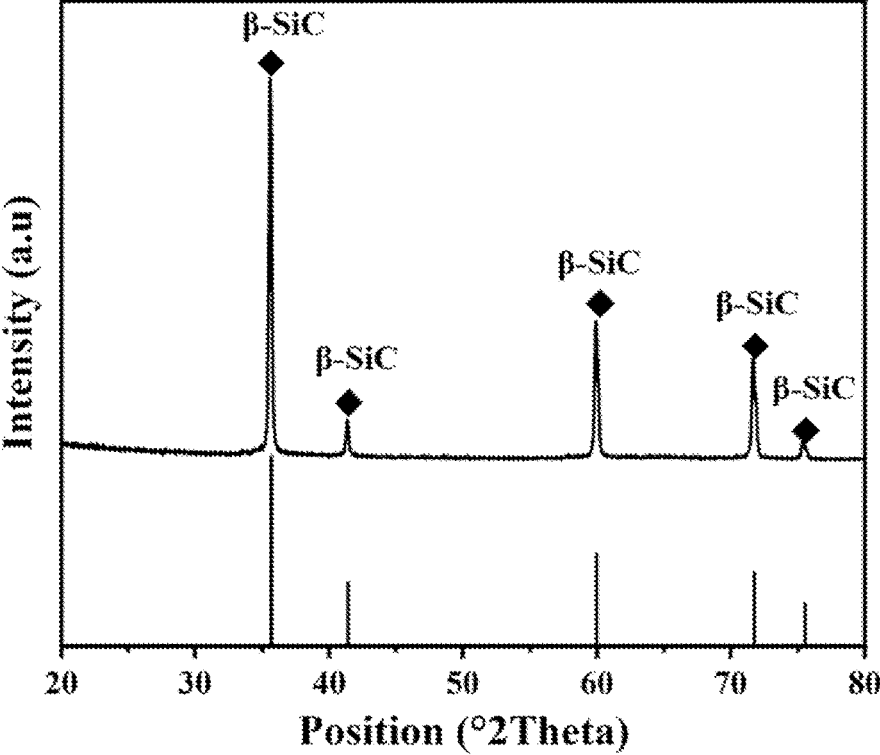

FIG. 3A and FIG. 3B present a comparative XRD analysis of the SiC complex components produced in Example 1 of the present invention and the Comparative Example. Specifically, FIG. 3A is the XRD pattern of SiC complex component obtained by the Comparative Example using "laser selective sintering, phenolic resin impregnation pyrolysis and reaction sintering"; FIG. 3B is the XRD pattern of the SiC complex component produced as per the example 1 of the present invention.

From FIG. 3A and FIG. 3B, the comparative example adopts "laser selective sintering, phenolic resin impregnation pyrolysis and reaction sintering" contains phases of SiC and Si, with a prominent peak of Si indicating a considerable residual silicon presence. In contrast, the SiC component prepared by the method provided by this present invention exhibits only a SiC peak, signifying a higher purity compared to conventional manufacturing methods.

Further, the Vickers hardness test was conducted on the SiC components prepared in Example 1 and the Comparative Example. The SiC components fabricated in the Comparative Example exhibited the Vickers hardness ranging from 2000 to 2300 Hv. In comparison, the Vickers hardness of the SiC component prepared in Example 1 of the present invention ranges from 2850 to 3000 Hv. This indicates that the hardness of high-end ceramic material complex components produced by the method provided by the present invention is greatly improved compared with conventional manufacturing methods.

Existing additive manufacturing technologies for utilize an indirect method of "printing forming followed by sintering post-processing", which leads to issues such as long production cycles, multiple processes and susceptibility to deformation. To address these problems, this invention proposes a method for the direct manufacturing of complex ceramic components using high-end ceramic materials via laser 3D printing. This method involves the decomposition of gaseous precursors and layer-by-layer accumulation, eliminating the need for sintering post-processing. As a result, it produces complex ceramic parts that are lightweight, highly pure, densely structured, and mechanically robust. This significantly shortens the production cycle for fabricating complex ceramic components using 3D printing methods.

The present invention boasts numerous benefits, including a significantly reduced fabrication cycle and fewer processing stages. The parts produced are characterized by their light weight, exceptional purity, high density, and excellent mechanical strength. This innovation effectively addresses the constraints inherent in conventional 3D printing techniques used for complex ceramic components, which typically depend on an indirect method of densification via "print forming followed by sintering post-processing". It markedly shortens the production cycle needed to manufacture advanced ceramic parts using 3D printing technology.

The examples provided above are only preferred embodiments of the present invention and are not intended to limit the implementation and protection scope of the present invention. Those skilled in the art should recognize that any equivalent substitutions and obvious changes made utilizing the contents of specification should be included within the scope of this invention. As such, the protection scope of this invention encompasses all such modifications and variations that are within the spirit and principle of this invention, as disclosed in this document.

What is claimed is:

1. A direct manufacturing method for ceramics component with complex structure based on laser 3D printing, comprising:

S1, obtaining a three-dimensional model of a complex component to be fabricated, and devising a laser scanning path;

S2, placing a substrate in a gas-phase reactor chamber, followed by vacuuming and aerating vapor mixture of gas-phase precursors and carrier gas into the gas-phase reactor chamber;

S3, preheating the substrate to a specified temperature, turning on a laser and a thermal imager, the thermal imager controlling laser power in real time by generating a two-dimensional temperature map of a laser spot to realize temperature control a printing process;

S4, setting a distance between a flat-field focusing lens and the substrate and a laser scanning speed, wherein a deflection angle of a galvanometer is adjusted to control the laser spot to be deflected to each of scanning points on the laser scanning path in turn, so as to thermally decompose the gas-phase precursor and generate one of ceramic sheets on the substrate;

S5, after stacking the one of the ceramic sheets, controlling the substrate to lower a height corresponding to a thickness of the ceramic sheet, and then stacking a next one of the ceramic sheets repeatedly, until completing a fabrication of the ceramic component, wherein in the S2, a pressure after vacuuming is below 10 Pa, and a pressure in the vacuum reactor chamber after aerating the vapor mixture ranges from 0.4 to 10 kPa, wherein in the S2, a volume ratio of the gas phase precursor to the carrier gas in the vapor mixture is 1:(1 to 100), wherein in the S4, the scanning speed of the laser is between 80 and 150 μm/s to decompose the gas-phase precursor and to avoid localized thicken of the ceramic sheet, and the distance between the flat field focusing lens and the substrate is between 30 and 45 cm.

2. The direct manufacturing method as claimed in claim 1, wherein in the S1, the three-dimensional model is saved in STL format, then slice the three-dimensional model through slicing software and save a file.

3. The direct manufacturing method as claimed in according to claim 1, wherein in the S2, the gas-phase precursor is selected from either a single one or a combination of methyltrichlorosilane, tetramethylsilane, silicon tetrachloride, ammonia, hexamethyldisilane, and trimethylamine borane.

4. The direct manufacturing method as claimed in according to claim 1, wherein in the S2, the carrier gas is selected from hydrogen or argon.

5. The direct manufacturing method as claimed in according to claim 1, wherein in the S3, the specified temperature of preheating the substrate is 200 to 400° C. cooler than a reaction temperature of the gas-phase precursor.

6. The direct manufacturing method as claimed in according to claim 1, wherein in the S4, a diameter of the laser spot is between 100 and 200 μm.

7. A ceramic component with complex structure, manufactured by the direct manufacturing method for ceramics component with complex structure based on laser 3D printing as claimed in claim 1.

* * * * *